(12) United States Patent
Poondru et al.

(10) Patent No.: US 8,793,105 B2
(45) Date of Patent: Jul. 29, 2014

(54) SYSTEMS AND METHODS FOR AIRBORNE PARTICLE CONTAMINATION CONTROL

(75) Inventors: Shirdish Poondru, Cincinnati, OH (US); Mel Allende-Blanco, Loveland, OH (US); Joseph Francis Kitching, Middletown, OH (US); Savas Aydore, West Chester, OH (US); Hasan Eroglu, Liberty, OH (US); Krista Beth Comstock, Mason, OH (US); Jianjun Feng, West Chester, OH (US); Yunpeng Yang, Mason, OH (US); John Ferney McKibben, West Chester, OH (US); James Kenneth Comer, Jr., West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 677 days.

(21) Appl. No.: 13/077,560

(22) Filed: Mar. 31, 2011

(65) Prior Publication Data

US 2012/0253769 A1    Oct. 4, 2012

(51) Int. Cl.
*G06F 7/60* (2006.01)
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| 4,551,810 | A | 11/1985 | Levine |
| 6,081,654 | A | 6/2000 | Morman et al. |
| 2003/0233049 | A1 | 12/2003 | Lampotang et al. |
| 2006/0271211 | A1* | 11/2006 | Gleason .......................... 700/73 |
| 2008/0221844 | A1* | 9/2008 | Howell et al. ..................... 703/2 |
| 2010/0250213 | A1* | 9/2010 | Kim et al. .......................... 703/9 |

OTHER PUBLICATIONS

Dols, A Tool for Modeling Airflow and Contaminant Transport, Ashrae Journal vol. 23, No. 3, 2001, 10 pgs.
Homlberg, et al., Modelling of the Indoor Environment—Particle Dispersion and Deposition, Indoor Air, 1998, 10 pgs.
Karaismail, et al., Numerical and Experimental Investigations on Hood Capture and Protection Efficiencies, 2008 ASME Fluids Engineering Conference, 2008, 10 pgs.
Iannantuoni, et al, Water Mist Fire Protection—Research on a Numerical Toolbox for Systems Effectiveness Assessment, Politecnico di Milano—Department of Energy, 6 pgs, Feb. 2010.
Zhang, et al., Experimental Measurements and Numerical Simulations of Particle Transport and Distribution in Ventilated Rooms, School of Mechanical Engineering, Purdue University, 2006, 20 pgs.

* cited by examiner

*Primary Examiner* — Dwin M Craig
(74) *Attorney, Agent, or Firm* — Andres E. Velarde; Megan C. Hymore (57) ABSTRACT

The present invention relates to a method for airborne particle contamination control, comprising: creating a simulation by modeling a turbulent airflow in an environment that includes an equipment of interest; plotting a flow parameter on the simulation to visualize a flow field of air according to a current design; creating an injection point on the simulation for particles in the environment; determining a particle concentration of the particles; determining, by a computing device and from the particle concentration, whether the current design provides contamination control; in response to determining that the current design does not provide contamination control, creating a modified design; and providing the modified design for implementation. The present invention further relates to a computing device for airborne particle contamination control. The present invention still further relates to a non-transitory computer-readable medium for airborne particle contamination control.

20 Claims, 7 Drawing Sheets
(3 of 7 Drawing Sheet(s) Filed in Color)

SYSTEMS AND METHODS FOR AIRBORNE PARTICLE CONTAMINATION CONTROL

FIELD OF THE INVENTION

The present application relates generally to predicting airflow and specifically to predicting the movement of airborne particles to more efficiently capture the airborne particles.

BACKGROUND OF THE INVENTION

In many environments, such as homes, factories, warehouses, etc., airborne particles, such as glues, smokes, dust, organic materials, etc. are created. These airborne particles may cause discomfort concerns to persons in the environments, health concerns to persons in the environments, fire hazards, equipment malfunction, product issues, and/or other issues. As an example, in many factory settings, various airborne particulates are created from a manufacturing process that can be harmful to those people in the factory. While many of these environments are equipped with one or more ventilation systems, oftentimes, the ventilations systems provide inadequate airflow to route and/or capture a desired amount of the particles.

SUMMARY OF THE INVENTION

The present invention relates to a method for airborne particle contamination control, comprising: creating a simulation by modeling a turbulent airflow in an environment that includes an equipment of interest; plotting a flow parameter on the simulation to visualize a flow field of air according to a current design; creating an injection point on the simulation for particles in the environment; determining a particle concentration of the particles; determining, by a computing device and from the particle concentration, whether the current design provides contamination control; in response to determining that the current design does not provide contamination control, creating a modified design; and providing the modified design for implementation.

The present invention further relates to a computing device for airborne particle contamination control, comprising: a memory component that stores airflow prediction logic and simulation logic, the simulation logic causing the computing device to create a simulation of a turbulent airflow in an environment, that includes an equipment of interest, the airflow prediction logic causing the computing device to perform at least the following: plot a flow parameter on the simulation to visualize a flow field of air in the environment; identify, from the flow parameter, an area of interest; create an injection point on the simulation for particles in the environment; determine a particle concentration of the particles around the area of interest; determine, from the particle concentration, whether a current design provides contamination control for the environment; in response to determining that the current design does not provide contamination control, modify the current design to create a modified design; and provide the modified design for implementation.

The present invention still further relates to a non-transitory computer-readable medium for airborne particle contamination control that stores logic that causes a computing device to perform the following: access simulation logic to create a simulation by modeling a turbulent airflow in an environment that includes an equipment of interest; plot a flow parameter on the simulation to visualize a flow field of air; identify, from the flow parameter, an area of interest; plot an air pressure contour, a velocity contour, and strain rate contour on the simulation, from the turbulent airflow; create an injection point on the simulation for particles in the environment; plot particle tracks of the particles on the simulation; determine a particle concentration of the particles; determine, from the particle concentration, whether a current design provides contamination control; in response to determining that the current design does not provide contamination control, modify the current design to create a modified design; and provide the modified design for implementation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary present inventions, except as may be explicitly delineated in the corresponding written description. None of the drawings are necessarily to scale.

DETAILED DESCRIPTION OF THE INVENTION

The present inventions are directed to systems and methods for predicting airflow to control airborne particle contamination. The systems and methods may be configured to simulate an environment that includes at least one piece of equipment. The environment may be a factory, home, office, warehouse, and/or other place where airborne particles pose a threat to the comfort and/or health of people or equipment in that environment. The simulation may include a determination regarding the flow of air in the environment. Creating the simulation may comprise at least one of the following: utilizing a computational fluid dynamics analysis, solving single-phase incompressible Navier-Stokes equations, solving single-phase compressible Navier-Stokes equations, determining steady state solutions, or determining transient solutions. Additionally, based on a predetermined type of particle in the air, such as an airfelt dust, a film dust, a dry laundry powder, a glue in non-contact applications, an ink fume in printing applications, absorbent gelling material (AGM) particles, chemical contaminants, aerosol fumes, and/or perfumes, a determination may be made regarding the flow of particles. With this information, the systems and methods disclosed herein may predict adjustments that may be made to a current system or design to more efficiently route air and thus reduce the effect of airborne particles. These and other features are discussed in more detail below.

The present invention relates to a method for airborne particle contamination control, comprising: creating a simulation by modeling a turbulent airflow in an environment that includes an equipment of interest; plotting a flow parameter on the simulation to visualize a flow field of air according to a current design; creating an injection point on the simulation for particles in the environment; determining a particle concentration of the particles; and determining, by a computing device and from the particle concentration, whether the current design provides contamination control. Determining whether the current design provides contamination control may comprise utilizing at least one of the following: streamlines and particle history. In response to determining that the current design does not provide contamination control, the method may comprise creating a modified design and providing the modified design for implementation. In response to determining that the current design does provide contamination control, the method may provide the current design for implementation.

The method may further comprising initializing a particle position of the particles, wherein plotting the flow parameter comprises at least one of the following: plotting a streamline on the simulation and plotting velocity vector on the simulation, wherein the flow field includes an air pressure contour, a strain rate contour, a velocity value, and a pressure value, wherein information regarding the air pressure contour and the strain rate contour are determined from the turbulent airflow, and wherein initializing a particle position is determined from the strain rate contour. The method may further comprise plotting particle tracks of the particles on the simulation, wherein plotting particle tracks comprises utilizing a one-way coupled Lagrangian particle tracking method.

The present invention further relates to a computing device for airborne particle contamination control, comprising: a memory component that stores airflow prediction logic and simulation logic, the simulation logic causing the computing device to create a simulation of a turbulent airflow in an environment, that includes an equipment of interest, the airflow prediction logic causing the computing device to perform at least the following: plot a flow parameter on the simulation to visualize a flow field of air in the environment; identify, from the flow parameter, an area of interest; create an injection point on the simulation for particles in the environment; determine a particle concentration of the particles around the area of interest; and determine, from the particle concentration, whether a current design provides contamination control for the environment. Determining whether the current design provides contamination control may comprise utilizing at least one of the following: streamlines and particle history. In response to determining that the current design does not provide contamination control, the current design may be modified to create a modified design for implementation. In response to determining that the current design does provide contamination control, the airflow prediction logic further causes the computing device to provide the current design for implementation.

The simulation logic may further cause the computing device to initialize a particle position of the particles, wherein plotting the flow parameter comprises at least one of the following: plotting a streamline on the simulation and plotting velocity vector on the simulation, wherein the flow field includes an air pressure contour, a strain rate contour, a velocity value, and a pressure value, wherein information regarding the air pressure contour and the strain rate contour are determined from the turbulent airflow, and wherein initializing the particle position is determined from the strain rate contour. The simulation logic may further cause the computing device to plot particle tracks of the particles on the simulation, wherein plotting the particle tracks comprises utilizing a one-way coupled Lagrangian particle tracking method.

The present invention still further relates to a non-transitory computer-readable medium for airborne particle contamination control that stores logic that causes a computing device to perform the following: access simulation logic to create a simulation by modeling a turbulent airflow in an environment that includes an equipment of interest; plot a flow parameter on the simulation to visualize a flow field of air; identify, from the flow parameter, an area of interest; plot an air pressure contour, a velocity contour, and strain rate contour on the simulation, from the turbulent airflow; create an injection point on the simulation for particles in the environment; plot particle tracks of the particles on the simulation; determine a particle concentration of the particles; and determine, from the particle concentration, whether a current design provides contamination control. Determining whether the current design provides contamination control comprises utilizing at least one of the following: streamlines and particle history. In response to determining that the current design does not provide contamination control, the current design may be modified to create a modified design for implementation.

The program may further cause the computing device to initialize a particle position of the particles, wherein information regarding the air pressure contour and the strain rate contour are determined from the turbulent airflow, and wherein initializing the particle position is determined from the strain rate contour. Plotting the particle tracks may comprise utilizing a one-way coupled Lagrangian particle tracking method.

Figure 1:
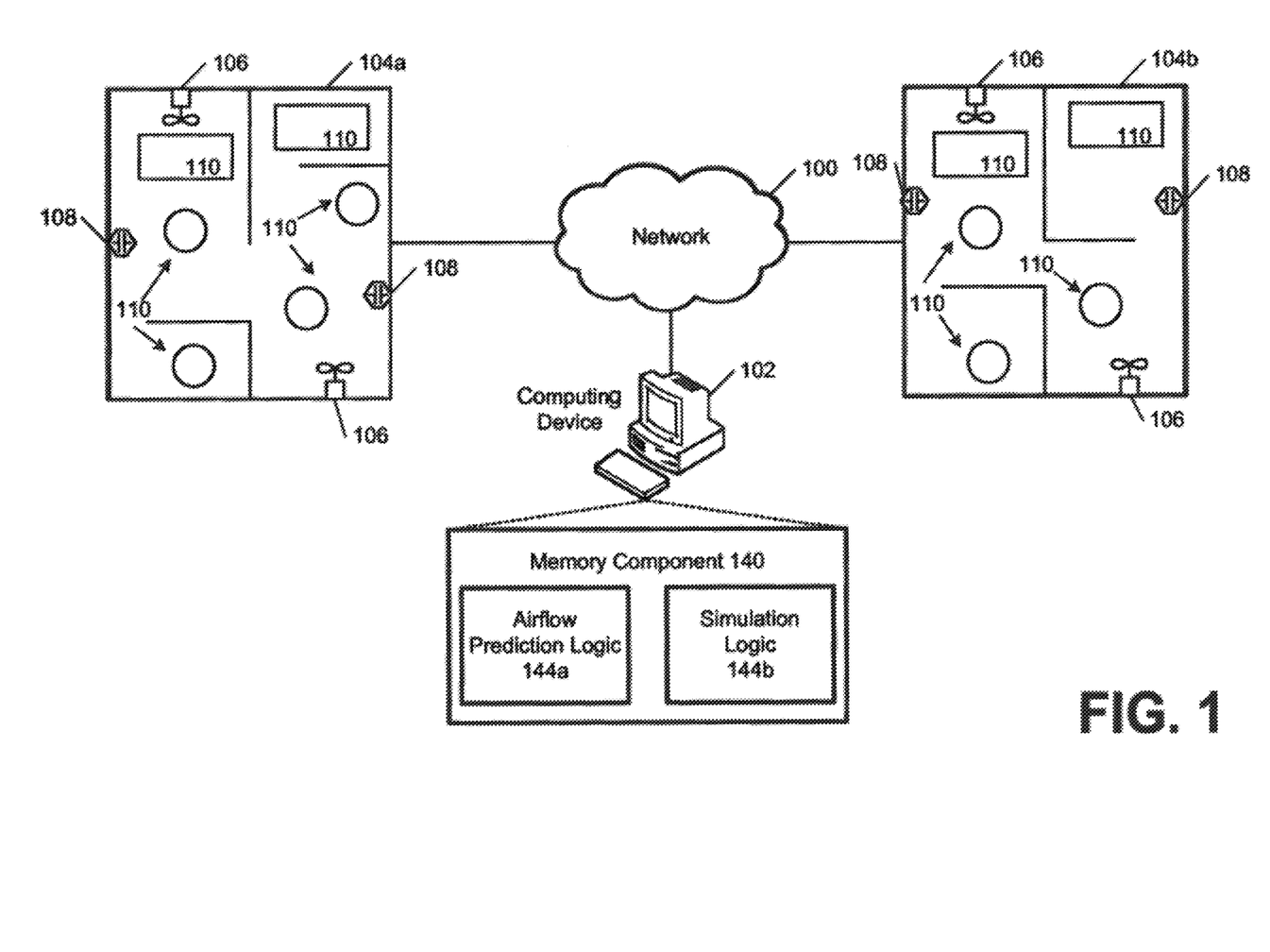
FIG. 1 depicts a computing environment for predicting airflow, according to embodiments disclosed herein.

FIG. 1 depicts an exemplary computing environment for predicting airflow. As illustrated, a network 100 may be coupled to a computing device 102 and one or more environments 104a, 104b. The computing device 102 may include a memory component 140, which may store airflow prediction logic 144a and simulation logic 144b. The environments 104a, 104b include an airflow system 106, one or more sensors 108 and one or more pieces of equipment 110. The airflow system 106 may be configured as a ventilation system and/or other mechanism for generating airflow and/or removing airborne particles. The sensors 108 may include air quality sensors and/or other mechanisms for determining the effectiveness of the airflow system 106. The equipment 110 may include manufacturing equipment or other similar hardware that may be responsible for creating and/or distributing the airborne particles. The airflow system 106, the sensors 108, and/or the equipment 110 may be communicatively coupled to the computing device 102 to provide data to and/or receive control instructions and/or data from the computing device 102.

Figure 2:
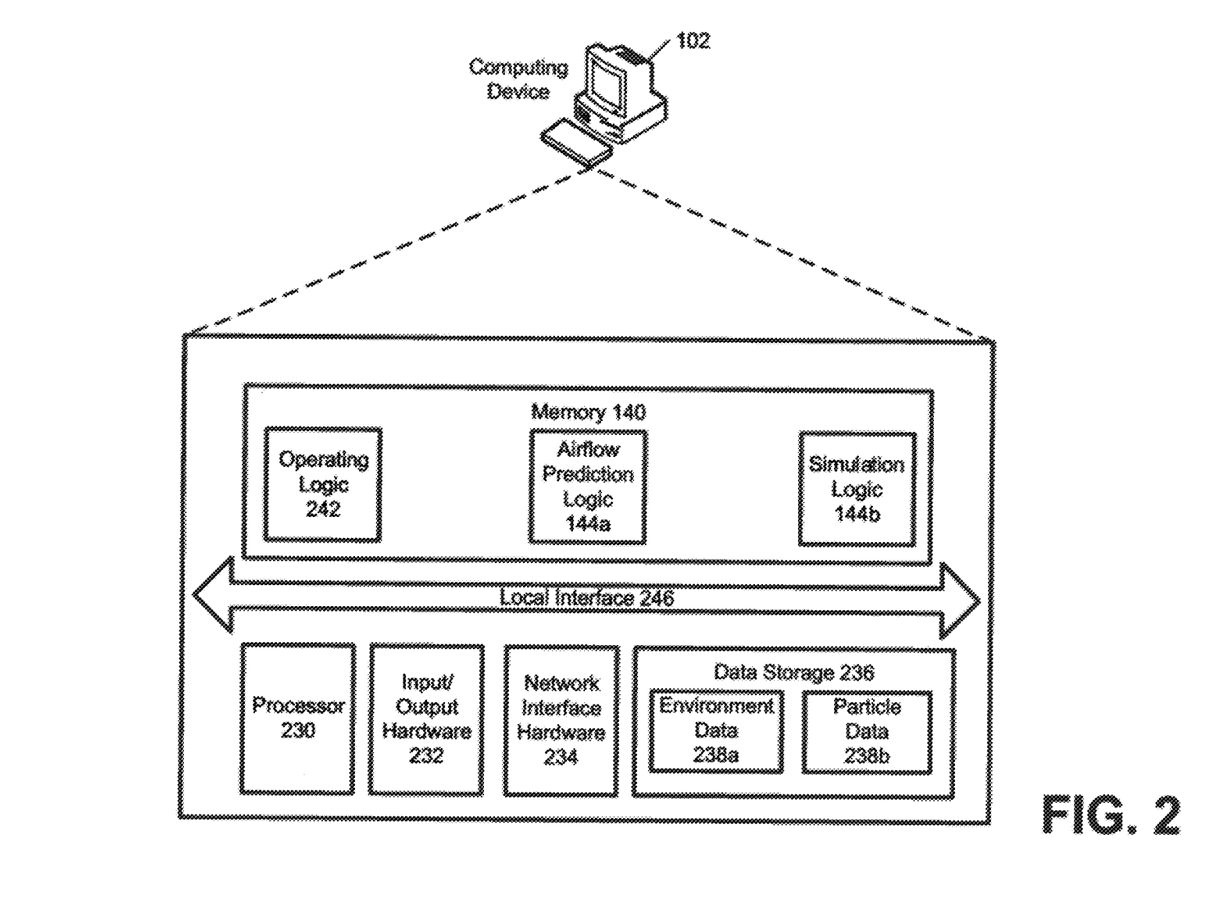
FIG. 2 depicts a computing device that may be utilized for predicting airflow, according to embodiments disclosed herein.

FIG. 2 depicts an exemplary computing device 102 that may be utilized for predicting airflow. The computing device 102 includes at least one processor 230, input/output hardware 232, network interface hardware 234, a data storage component 236 (which includes environment data 238a, particle data 238b, and/or other data), and the memory component 140. The memory component 140 may be configured as volatile and/or nonvolatile memory and, as such, may include random access memory (including SRAM, DRAM, and/or other types of RAM), flash memory, secure digital (SD) memory, registers, compact discs (CD), digital video discs (DVD), and/or other types of non-transitory computer-readable mediums. These non-transitory computer-readable mediums may reside within the computing device 102 and/or external to the computing device 102.

Additionally, the memory component 140 may be configured to store operating logic 242, the airflow prediction logic 144a, and the simulation logic 144b. The airflow prediction logic 144a and the simulation logic 144b may each include a plurality of different pieces of logic, each of which may be embodied as a computer program, firmware, and/or hardware, as an example. The airflow prediction logic 144a and/or the simulation logic 144b may include any privately coded and/or proprietary software, such as AcuSim, Fluent, and/or OpenFOAM. A local interface 246 is also included in FIG. 2 and may be implemented as a bus or other interface to facilitate communication among the components of the computing device 102.

The processor 230 may include any processing component operable to receive and execute instructions (such as from the data storage component 236 and/or memory component 140). The input/output hardware 232 may include and/or be configured to interface with a monitor, positioning system, keyboard, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the computing device 102 and other computing devices. The processor may also include and/or be coupled to a graphical processing unit (GPU).

The operating logic 242 may include an operating system and/or other software for managing components of the computing device 102. Similarly, as discussed above, the airflow prediction logic 144a may reside in the memory component 140 and may be configured to cause the processor 230 to predict airflow in the environments 104a, 104b and/or provide other functionality, such as determining whether a current design is providing sufficient contamination control.

It should be understood that the components illustrated in FIG. 2 are merely illustrative and are not intended to limit the scope of this disclosure. While the components in FIG. 2 are illustrated as residing within the computing device 102, this is merely an example. One or more of the components may reside external to the computing device 102. It should also be understood that, while the computing device 102 in FIG. 2 is illustrated as a single device, this is also merely an example. The airflow prediction logic 144a and the simulation logic 144b may reside on different devices.

Additionally, while the computing device 102 is illustrated with airflow prediction logic 144a and the simulation logic 144b as separate logical components, this is also an example. More specifically, a single piece of logic may perform the described functionality.

Figures 3, 4:
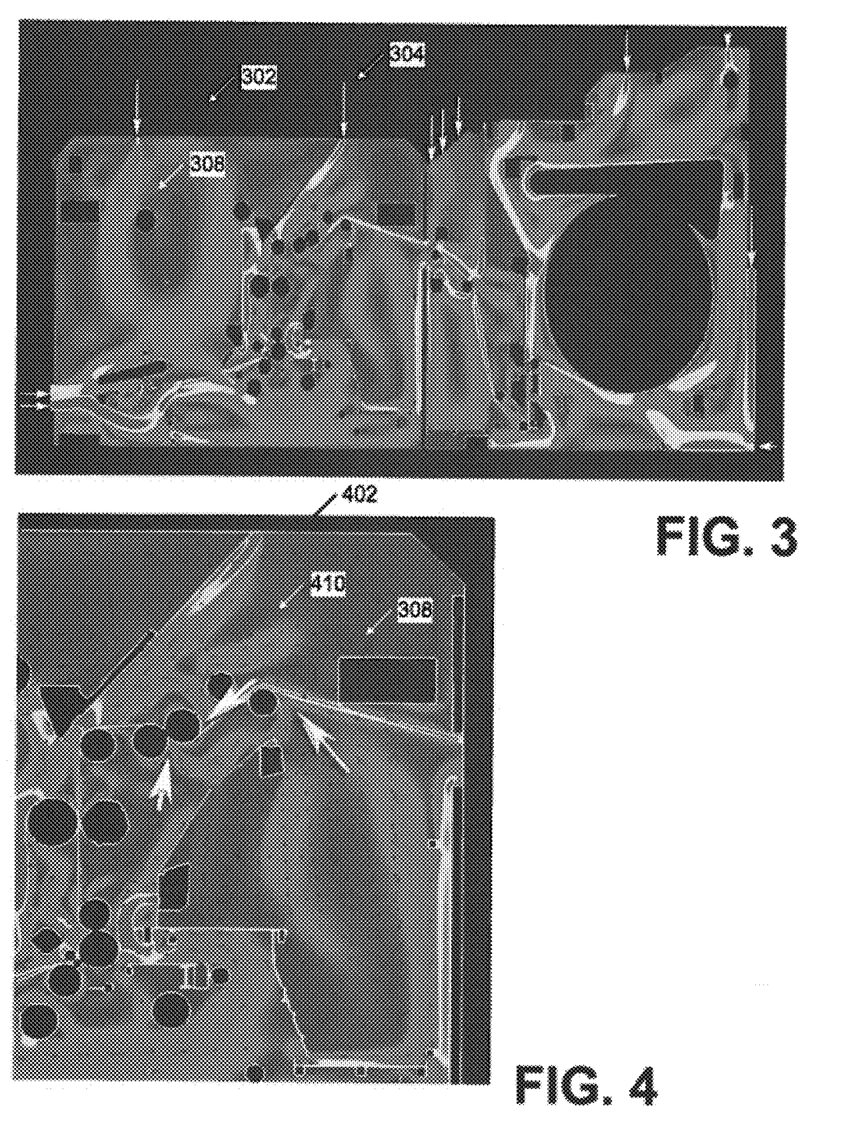
FIG. 3 depicts a simulation interface that may be provided for predicting airflow, according to embodiments disclosed herein.
FIG. 4 depicts a simulation interface that may be provided for determining a velocity contour, according to embodiments disclosed herein.

FIG. 3 depicts an exemplary simulation interface 302 that may be provided for predicting airflow. As illustrated, the simulation interface 302 may be provided by the computing device 102 and may be configured to illustrate air speed (and/or velocity), where blue indicates low air speed, red indicates high air speed, and other colors indicate a speed according to the color spectrum. Similarly, the arrows indicate ambient room air inlets, such as may be utilized by the airflow system 106 (from FIG. 1). The inlets may include points where the airflow system receives and/or distributes airflow. Additionally included is the equipment 308, which is depicted as the black blocks in FIG. 3.

As an example, airflow prediction logic 144a and the simulation logic 144b may be configured to cause the computing device 102 (FIGS. 1, 2) to simulate an environment. The shape, size, and/or other data regarding the environment 104 may be determined via user input, from the environment data 238a, and/or from the sensors 108 (also FIG. 1). Regardless, once the environment has been simulated, the computing device 102 can predict the airflow characteristics. More specifically, with information regarding the shape and size of the environment, as well as information related to the specifications of the airflow system 106, the computing device 102 can predict parameters of the airflow in the simulated environment. Additionally, this prediction may be graphically represented via the simulation interface 302, which utilizes the color spectrum to indicate air speed. With that said, other mechanisms may be utilized for providing this information.

It should also be understood that in addition to creation of the simulation, the computing device 102 (FIGS. 1, 2) may also be configured to modify the simulation. Such modifications may include changing of equipment, adding additional regions of positive air, and/or other changes.

FIG. 4 depicts an exemplary simulation interface 402 that may be provided for determining a velocity contour. As illustrated, the simulation interface 402 may be representative of at least a portion of the simulation interface 302 from FIG. 3 and may be referred to as the fluid domain. In addition to the airflow speed and equipment 308 represented in the simulation interface 402, velocity vectors 410 provided for further visualizing flow patterns and/or identifying recirculation zones within the environment.

Figure 5:
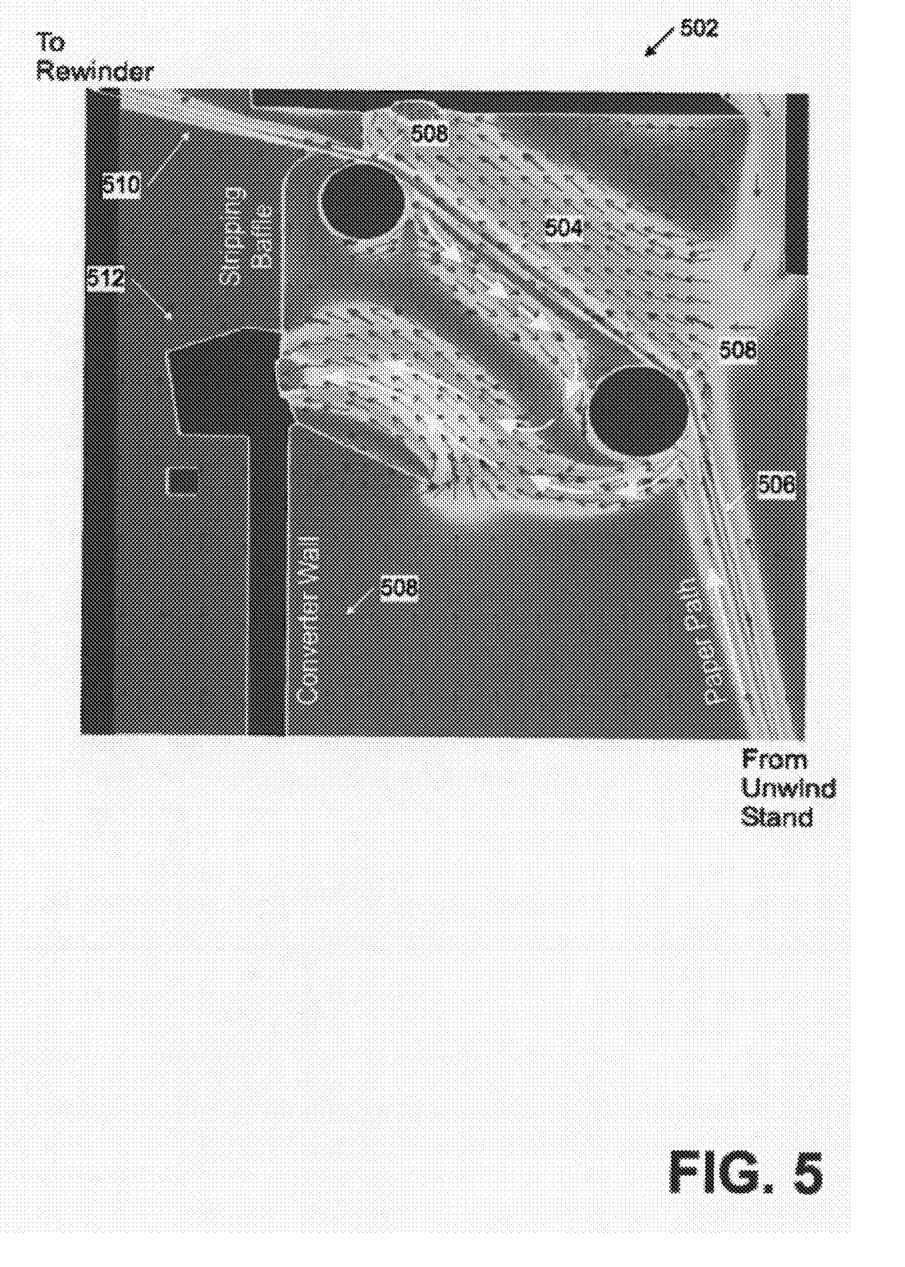
FIG. 5 depicts a simulation interface for airflow velocity vectors, according to embodiments disclosed herein.

FIG. 5 depicts an exemplary simulation interface 502 for airflow velocity vectors. As illustrated, the simulation interface 502 includes vectors that indicate airflow patterns. Additionally, the computing device 102 may also determine a probable path of airborne particles. The probable path of airborne particles may be represented by large arrows 504, which illustrates areas where particles likely flow. As such, the manufacturing process represented in the simulation interface 502 sends a product along a paper path 506. While the paper path 506 is illustrated in FIG. 5, other types of equipment may be used. As an example in the paper industry, a web path, conveyor, etc. may be utilized. The product is then transferred in and/or around a couple of pieces of equipment 508 to a rewinder 510. Accordingly, the airflow may be directed in a similar direction, but may be affected by an airflow system 512. The airflow path may be represented according to the large arrows 504.

Figure 6:
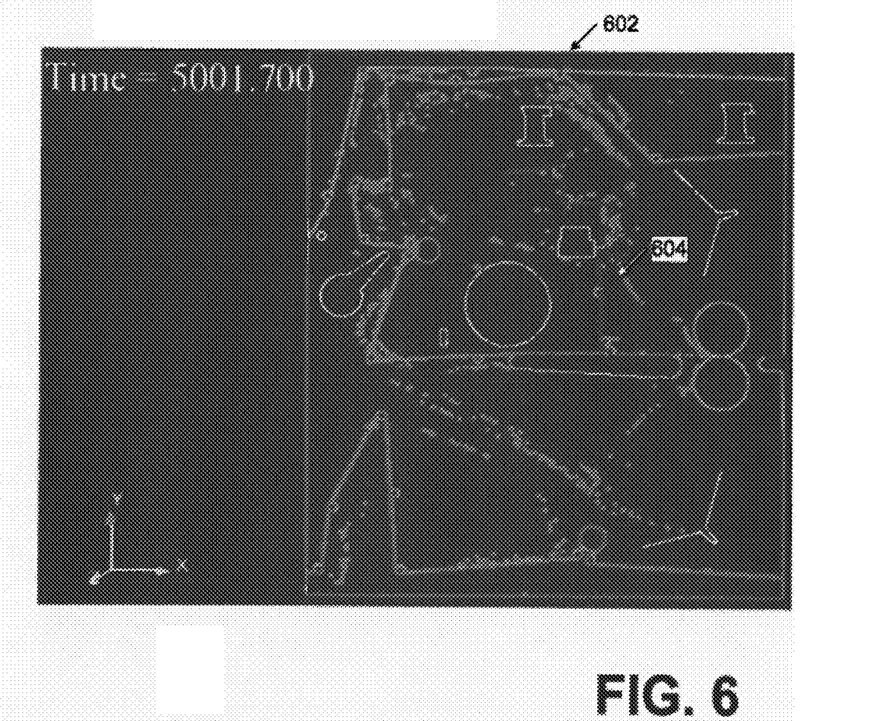
FIG. 6 depicts a simulation interface for plotting particle tracks, according to embodiments disclosed herein.

FIG. 6 depicts an exemplary simulation interface 602 for plotting particle tracks. More specifically, once the probable path of airborne particles is determined (and/or plotted), a determination of the particle tracks 604 and/or particle position released is determined and/or plotted. This may facilitate the visualization of the dispersion of the particles and may be accomplished utilizing a one-way coupled Lagrangian particle tracking method and/or other mechanisms for tracking the particle position. In the Lagrangian one way coupled approach, the continuous phase flow pattern is not impacted by the discrete phase. In addition, an option to input constant particle diameter or distribution to have multiple diameters injections may be provided. The size distribution of the particles may be implemented using the Rosin-Rammler diameter distribution method and/or similar methods. From this information, a determination can be made regarding whether a current design of the airflow system and equipment placement adequately provides contamination control. If it is determined that adequate contamination control is not currently being achieved, the computing device 102 can determine a modified design, where at least one component in the current design is changed. As an example, the computing device 102 may alter the position of the airflow system and/or equipment. The computing device 102 may alter the type and/or power of the airflow system.

Once a change is made, the computing device 102 can simulate the environment again with the proposed design and determine whether the proposed design will adequately control particle contamination. This determination may be made based on a percentage of particles captured by the airflow system; particle tracks left in the proposed design; and/or other criteria, such as a government regulation, Occupational Safety and Health Administration (OSHA) regulation, an industry safety health standard, etc. For example, if a proposed design meets a government regulation, the proposed design may be sent for implementation. If the proposed design does not meet the government regulations, the computing device 102 may redesign the configuration.

Where particle volume fraction range is up to 15%, the Lagrangian one way coupled approached may be utilized. In other situations, the fraction range is not so limited. Additionally, discrete particles may be simulated such that the particles do not interface with other particles, but do interact (such as bouncing off and/or resting on) with the virtual surfaces in the simulated environment.

It should also be understood that the particles themselves may also be simulated. More specifically, while actual particles are likely of irregular shapes, the simulation may estimate the particles depending on the material in the particles, and create regular shapes (such as spheres) with an approximately equivalent diameter. Additionally, while the particles may take any shape and size based on the material of the particle, the particles range from about 0.1 microns in diameter to about 100 microns in diameter. Similarly, because of the irregular shapes of the particles, the simulation may utilize a particle size distribution to represent these irregular shapes. Further, the dispersion of particles due to turbulence in the fluid domain may be predicted using a stochastic tracking (random walk) model. There is also an option to ignore the effect of instantaneous turbulent velocity fluctuations on the particle trajectories.

Figure 7:
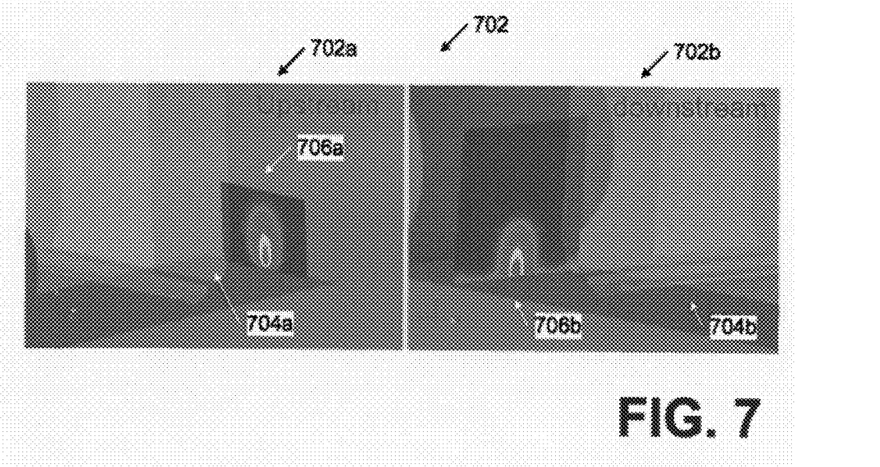
FIG. 7 depicts a simulation interface for plotting particle flux contours, according to embodiments disclosed herein.

FIG. 7 depicts an exemplary simulation interface 702 for plotting particle flux contours. As illustrated, the simulation interface 702 may include an upstream interface 702a of the contamination source and a downstream interface 702b of the contamination source. The upstream interface 702a provides a particle flow simulation 704a. Additionally, a surface 706a may be defined to determine the particle flux across a virtual surface. The surface may be part of the simulated environment and/or imposed to merely determine the particle flux contour for that space. As before, the red portion indicates a high particle flux region, while the blue represents a low particle flux region. Similarly, in the downstream interface 702b, a flow simulation 704b may indicate particle flow from an opposite perspective. A surface 706b in the downstream interface may indicate the particle flux contour from the opposite perspective. With this information, a determination may be made regarding whether to locate a piece of equipment or not to reduce particle contamination in the environment.

It should be understood that while a particle flux contour may be provided in the simulation interface 702, this is merely an example. Other data, such as a strain rate contour, a velocity contour, etc. may be utilized in addition to or as a substitute for the particle flux contour. A similar interface and determination may be made to determine whether the current design or proposed design provides an adequate level of particle control.

Figure 8:
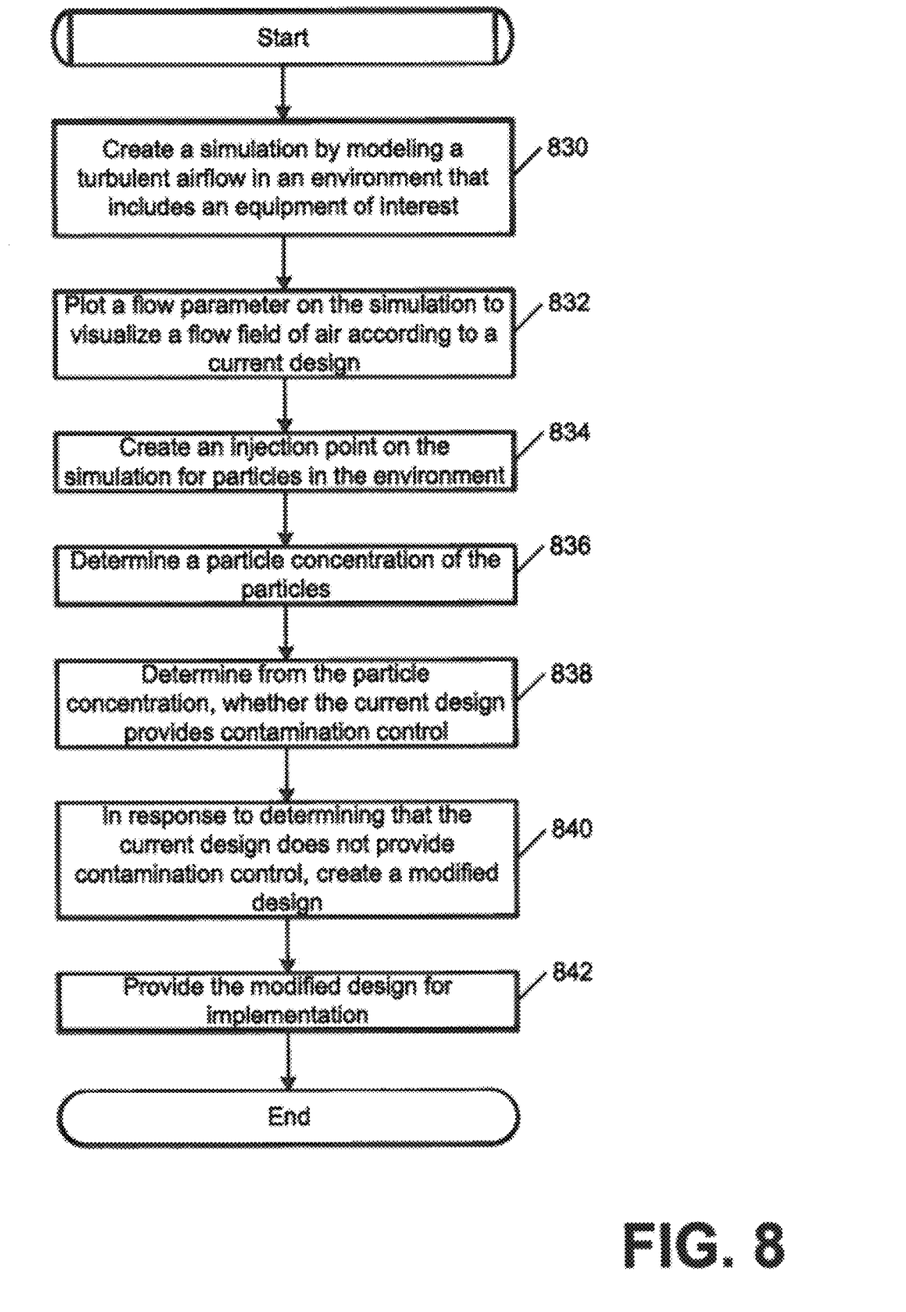
FIG. 8 depicts a flowchart for predicting airflow in an environment, according to embodiments disclosed herein.

FIG. 8 depicts an exemplary flowchart for predicting airflow in an environment. As illustrated in block 830, a simulation may be created by modeling a turbulent airflow in an environment that includes an equipment of interest. Creation of the simulation may include utilizing a computational fluid dynamics analysis, solving single-phase incompressible Navier-Stokes equations, solving single phase compressible Navier-Stokes equations, determining steady state solutions and/or determining transient solutions. At block 832, a flow parameter, such as a streamline and/or velocity vector may be plotted on the simulation to visualize a flow field of air according to a current design. The flow field may include a velocity value, a pressure value, a velocity gradient, etc. At block 834, an injection point on the simulation may be created for particles in the environment. More specifically, a strain rate and/or pressure value may be plotted and an identification of a numerical range to create injection points for the particles may be determined. At block 836, a particle concentration of the particles may be determined. At block 838, a determination may be made from the particle concentration, whether the current design provides contamination control. This may include utilizing streamlines and/or a particle history. At block 840, in response to determining that the current design does not provide contamination control, a modified design may be created. At block 842, the modified design may be provided for implementation.

Figure 9:
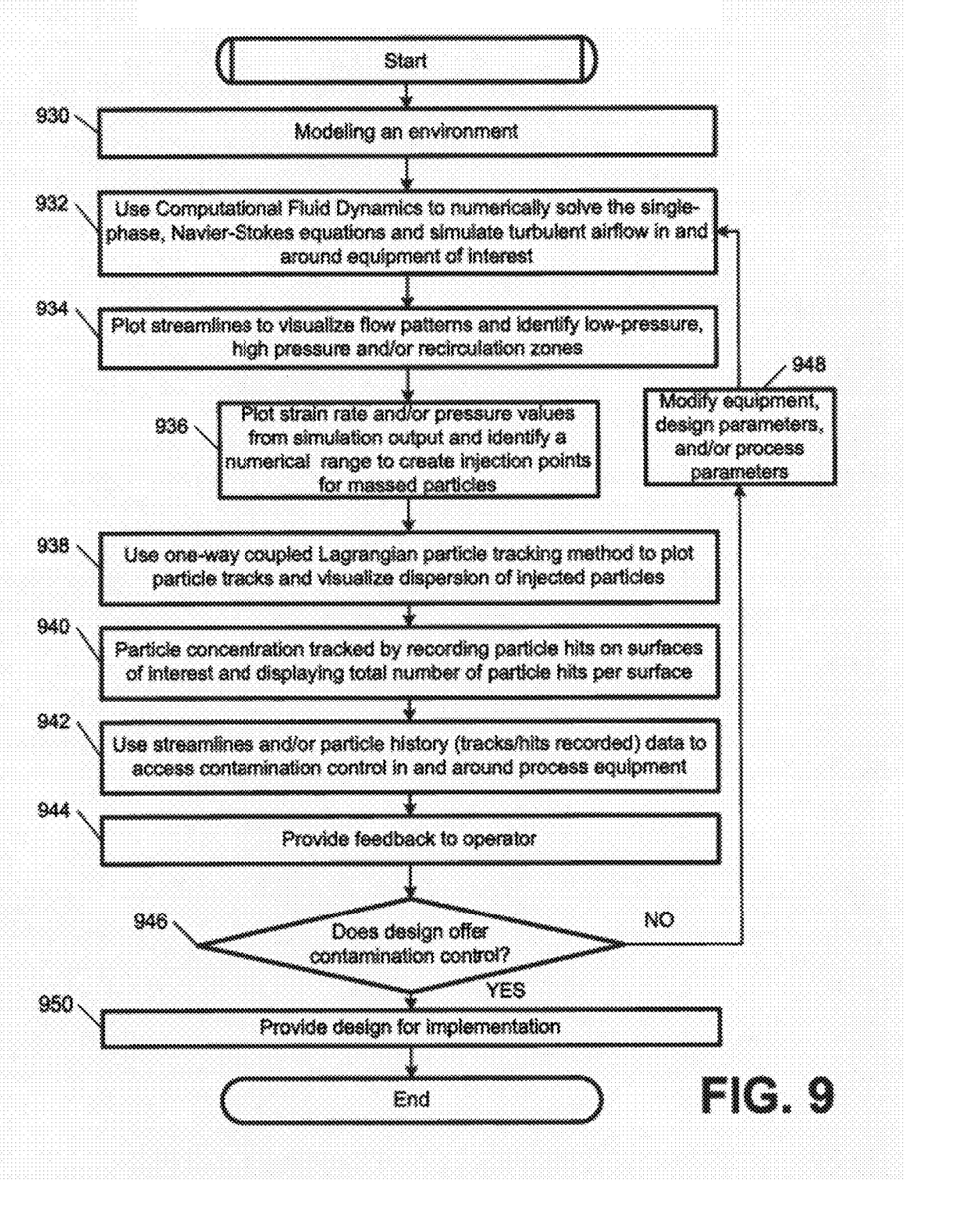
FIG. 9 depicts a flowchart for determining contamination control of airborne particles in an environment, according to embodiments disclosed herein.

FIG. 9 depicts an exemplary flowchart for determining contamination control of airborne particles in an environment. As illustrated at block 930, an environment may be modeled. This may include determining boundary conditions, geographical design details, and/or experimental design details. Regardless, the environment, as well as the equipment and operation of that equipment may be modeled. Additionally, at block 932, computational fluid dynamics may be utilized to numerically solve single phase Navier-Stokes equations (compressible and/or incompressible) in and around a piece of equipment. At block 934, streamlines may be plotted to visualize flow patterns and identify low pressure, high pressure, and/or recirculation zones. At block 936, strain rate and/or pressure values may be plotted. Additionally, a numerical range may be identified to create injection points for the particles. At block 938, particle tracks can be plotted and dispersion of injected particles may be visualized using a one-way coupled Lagrangian particle tracking method. At block 940, particle concentration may be tracked by recording particle hits on surfaces of interest and a total number of particle hits may be displayed. At block 942, streamlines and/or a particle history (including tracks and/or hits recorded) may be utilized to access contamination control in and around the equipment. At block 944, feedback may be provided to an operator, such as an engineer and/or administrator. The feedback may include one or more user interface (such as illustrated in FIGS. 3-6), a report, a data sheet, etc.

At block 946, a determination may be made regarding whether the current design provides contamination control of the airborne particles. If so, the process may provide the design for implementation. If, at block 946, the design does not provide contamination control, at block 944, the equipment, design parameters, and/or process parameters (such as duct size, duct shape, vacuum flow rate, process temperature, etc.) may be modified and the process may return to block 932. As illustrated, the process of FIG. 9 may be an iterative process that may be executed until a desired design is achieved; for instance, a plurality of different simulations may be run to achieve the desired design.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be understood to those skilled in the art that various other changes and modifications can be made without departing from the spirit and scope of the invention. It is therefore intended to cover in the appended claims all such changes and modifications that are within the scope of this invention.

What is claimed is:

1. A computerized method for airborne particle contamination control, comprising:
    creating a simulation by modeling a turbulent airflow in an environment selected from the group consisting of a home, a factory, an office, or a warehouse wherein the environment includes an equipment of interest responsible for creating or distributing airborne particles;
    plotting a flow parameter on the stimulation to visualize a flow field of air according to a current design;
    creating an injection point on the simulation for particles in the environment; determining a particle concentration of the particles; determining, by a computing device and from the particle concentration, whether the current design provides adequate contamination control;
    in response to determining that the current design does not provide adequate contamination control,
    creating a modified design; where at least one component in the current design has change; and providing the modified design for implementation.

2. The computerized method of claim 1, wherein creating the simulation comprises at least one of the following: utilizing a computational fluid dynamics analysis, solving single-phase incompressible Navier-Stokes equations, solving single-phase compressible Navier-Stokes equations, determining steady state solutions, and determining transient solutions.

3. The computerized method of claim 1, wherein the particles include at least one of the following: an airfelt dust, a film dust, a dry laundry powder, a glue in non-contact applications, an ink fume in printing applications, absorbent gelling material (AGM) particles, chemical contaminants, aerosol fumes, and perfumes.

4. The computerized method of claim 1, further comprising initializing a particle position of the particles, wherein plotting the flow parameter comprises at least one of the following: plotting a streamline on the simulation and plotting velocity vector on the simulation, wherein the flow field includes an air pressure contour, a strain rate contour, a velocity value, and a pressure value, wherein information regarding the air pressure contour and the strain rate contour are determined from the turbulent airflow, and wherein initializing a particle position is determined from the strain rate contour.

5. The computerized method of claim 1, further comprising plotting particle tracks of the particles on the simulation, wherein plotting particle tracks comprises utilizing a one-way coupled Lagrangian particle tracking method.

6. The computerized method of claim 1, wherein determining whether the current design provides contamination control comprises utilizing at least one of the following: streamlines and particle history.

7. The computerized method of claim 1, further comprising, in response to determining that the current design does provide contamination control, providing the current design for implementation.

8. A computerized device for airborne particle contamination control, comprising;

a processor;

a memory component that stores airflow prediction logic and simulation logic, the simulation logic causing the computing device to create a simulation of a turbulent airflow in an environment selected from the group consisting of a home, a factory, an office, or a warehouse, that includes an equipment of interest, the airflow prediction logic causing the computing device to perform at least the following: plot a flow parameter on the simulation to visualize a flow field of air in the environment; identify, from the flow parameter, an area of interest; create an injection point on the simulation for particles in the environment; determine a particle concentration of the particles around the area of interest; determine, from the particle concentration, whether a current design provides;

adequate contamination control for the environment;

in response to determining that the current design does not provide adequate contamination control;

modifying the current design to create a modified design where at least one component in the current design has changed; and providing the modified design for implementation.

9. The computing device of claim 8, wherein creating the simulation comprises at least one of the following: utilizing a computational fluid dynamics analysis, solving single-phase incompressible Navier-Stokes equations, solving single-phase compressible Navier-Stokes equations, determining steady state solutions, and determining transient solutions.

10. The computing device of claim 8, wherein the particles include at least one of the following: an airfelt dust, a film dust, a dry laundry powder, a glue in non-contact applications, an ink fume in printing applications, absorbent gelling material (AGM) particles, chemical contaminants, aerosol fumes, and perfumes.

11. The computing device of claim 8, wherein the simulation logic further causes the computing device to initialize a particle position of the particles, wherein plotting the flow parameter comprises at least one of the following: plotting a streamline on the simulation and plotting velocity vector on the simulation, wherein the flow field includes an air pressure contour, a strain rate contour, a velocity value, and a pressure value, wherein information regarding the air pressure contour and the strain rate contour are determined from the turbulent airflow, and wherein initializing the particle position is determined from the strain rate contour.

12. The computing device of claim 8, wherein the simulation logic further causes the computing device to plot particle tracks of the particles on the simulation, wherein plotting the particle tracks comprises utilizing a one-way coupled Lagrangian particle tracking method.

13. The computing device of claim 8, wherein determining whether the current design provides contamination control for the environment comprises utilizing at least one of the following: streamlines and particle history.

14. The computing device of claim 8, wherein the airflow prediction logic further causes the computing device to, in response to determining that the current design does provide contamination control, provide the current design for implementation.

15. A non-transitory computer-readable medium for airborne particle contamination control that stores computer executable instructions that when executed by a computing device performs the following:
   access simulation logic to create a simulation by modeling a turbulent airflow in an environment selected from the group consisting of a home, a factory, an office, or a warehouse that includes an equipment of interest; plot a flow parameter on the simulation to visualize a flow field of air; identify, from the flow parameter, an area of interest; plot an air pressure contour, a velocity contour, and strain rate contour on the simulation,
   from the turbulent airflow;
   create an injection point on the simulation for particles in the environment;
   plot particle tracks of the particles on the simulation; determine a particle concentration of the particles; determine, from the particle concentration, whether a current design provides adequate contamination control;

in response to determining that the current design does not provide adequate contamination control;

modify the current design to create a modified design where at least one component in the current design has changed; and provide the modified design for implementation.

16. The non-transitory computer-readable medium of claim 15, wherein creating the simulation comprises at least one of the following: utilizing a computational fluid dynamics, solving single-phase incompressible Navier-Stokes equations, solving single-phase compressible Navier-Stokes equations, determining steady state solutions, and determining transient solutions.

17. The non-transitory computer-readable medium of claim 15, wherein the particles include at least one of the following: an airfelt dust, a film dust, a dry laundry powder, a glue in non-contact applications, an ink fume in printing applications, absorbent gelling material (AGM) particles, chemical contaminants, aerosol fumes, and perfumes.

18. The non-transitory computer-readable medium of claim 15, the program further causing the computing device to initialize a particle position of the particles, wherein information regarding the air pressure contour and the strain rate contour are determined from the turbulent airflow, and wherein initializing the particle position is determined from the strain rate contour.

19. The non-transitory computer-readable medium of claim 15, wherein plotting the particle tracks comprises utilizing a one-way coupled Lagrangian particle tracking method.

20. The non-transitory computer-readable medium of claim 15, wherein determining whether the current design provides contamination control comprises utilizing at least one of the following: streamlines and particle history.

* * * * *